United States Patent [19]

Lippmann et al.

[11] Patent Number: 5,695,269

[45] Date of Patent: Dec. 9, 1997

[54] MULTI-COLOR DISPLAY LIGHTING BY LED

[75] Inventors: Raymond Lippmann, Ann Harbor; Michael John Schnars, Clarkston; James Edward Nelson, North Branch; Mark James Miller, Grand Blanc, all of Mich.

[73] Assignee: Delco Electronics Corporation, Kokomo, Ind.

[21] Appl. No.: 594,062

[22] Filed: Jan. 29, 1996

[51] Int. Cl.[6] ............................................. F21V 8/00

[52] U.S. Cl. .................... 362/27; 362/31; 362/32; 362/231; 362/293; 40/444; 40/547

[58] Field of Search ............... 362/26, 27, 31, 362/32, 230, 231, 246, 293; 40/444, 546, 547

[56] References Cited

U.S. PATENT DOCUMENTS

| | | | |
|---|---|---|---|
| 2,646,637 | 2/1953 | Nierenberg et al. | 40/546 |
| 3,302,012 | 1/1967 | Reppisch | 40/546 |
| 3,761,704 | 9/1973 | Takeichi et al. | 362/27 |
| 4,924,356 | 5/1990 | French et al. | 362/31 |
| 5,043,850 | 8/1991 | Dreyer, Jr. | 362/27 |
| 5,375,043 | 12/1994 | Tokunaga | 362/31 |

*Primary Examiner*—Alan Cariaso
*Attorney, Agent, or Firm*—Jimmy L. Funke

[57] ABSTRACT

An LCD display is backlit by a main light pipe with LEDs of a first color along one edge or opposed edges which uniformly flood the display with the first color, and with an LED of a second color coupled by a second light pipe to another edge to introduce light to local areas of the main light pipe. Filters of the second color over the local areas are illuminated by the second color LED. Prismatic sheets between the main light pipe and the LCD aid in the uniform distribution of the first color and improve display brightness by directing light toward the operator's eyebox.

12 Claims, 1 Drawing Sheet

MULTI-COLOR DISPLAY LIGHTING BY LED

FIELD OF THE INVENTION

This invention relates to backlit automotive displays and particularly to such displays having multiple colors.

BACKGROUND OF THE INVENTION

Automotive instrument clusters often employ displays such as liquid crystal displays (LCDs) which require back lighting. Bright light sources are needed for back lighting because polarization effects of LCDs block passage of much of the available light, and because a dark filter is needed to produce a dark dead front appearance even in the presence of bright sunlight. Accordingly large light sources behind the display have been used. Such sources require much power and dissipate undesirable amounts of heat in the confined region of the cluster. To produce uniform illumination the sources are spaced substantially from the LCD, thereby requiring a large package depth. However, recent automotive requirements demand thinner display packages which use less power and which contain many more warning tell-tale light and enunciators.

It has been proposed to use an array of LEDs (light emitting diodes) spaced behind the LCD for display lighting, but still enough spacing for light uniformity is needed. LEDs produce light in a highly localized area and require diffusing optics in order to limit hot spots. The diffusing optics are typically quite lossy and both absorb light and cause much of it to be scattered away from the drivers eyebox which is the viewing area.

Another proposal is set forth in the international patent application WO 94/29765 entitled LIQUID CRYSTAL DISPLAY WITH ENHANCED BRIGHTNESS. That disclosure uses a large area light source which is a fluorescent lamp mounted at the edge of a light pipe, and a prismatic film formed with a plurality of grooves for directing light from the light pipe to an LCD. The grooves run transverse to the direction of light entering the light pipe and tend to normalize the direction of the light relative to the film, with the effect of concentrating more light to the eyebox.

Recently LEDs have been improved to produce much more light than previous versions. LEDs are desirable for display lighting in that they consume low power,. are very small and are available in colors such as amber and red which are often used in automotive displays. Many such displays have multiple colors in close proximity to one another. For example, a red warning band on a tachometer may abut a yellow warning band to indicate various degrees of caution. In some cases, the general lighting scheme for a gauge may be amber, and red enunciators may lie close by. The proximity of areas of different colors are particularly common when LCDs are used, in part because economics dictate that the display areas should be small. LEDs emit light over a very limited range of frequencies. Placing a red filter over an area lit by an orange LED merely causes the resulting area to appear poorly lit in orange. Since in this case, the LED does not produce significant amount of light in any color but orange, the red filter only attenuates the available light rather than changing the apparent light color. In the past, incandescent lights, vacuum fluorescent lights or fluorescent lights were used to back light LCDs and other automotive display areas and all of these sources were sufficiently wide band to allow filters to be effective in changing the apparent color of local areas—the wider the spectral band width of the light source, the more effective the filters. Because of power dissipation limitations, cost, requirements for thin products and other considerations, there is a desire to use LEDs in many applications.

When using LEDs for back lighting multiple colors, it is often impractical to use the traditional method of dividing light areas of differing tone by using enclosing walls around each area of different color. Tolerances can be tight and it is hard to align the walls with the LCD image. The shapes of local color areas can also often be irregular and it is difficult to light each area evenly and uniformly.

SUMMARY OF THE INVENTION

It is therefore an object of the invention to afford multiple color backlit displays having LED sources. Another object is to obtain such displays which are thin. A further object is to obtain such multiple colors without walls for separating color areas.

A display device may be reconfigurable as in the case of an LCD which can show various messages or symbols, or passive such as an applique of a fixed symbol or message. In either case the display device defines characters or symbols by selectively transmitting light. The display is in front of (or above) a lighting arrangement. The light may be turned on or change colors to enunciate the message. The display has a predominant theme of a first color and local areas of a second color. A filter passing only the second color covers the local areas on the LCD.

An improved lighting arrangement includes a rectangular plastic light pipe with narrow side edges which is edge lit by a small area first light source such as an LED or a plurality of LEDs of a first color at one edge or at two opposed edges. At least one of the top or bottom surfaces of the light pipe is abraded or has diffusing features which allows a small percentage of the light in the pipe to be scattered at the surface. A second light source comprises an elongated second light pipe along an edge perpendicular to an edge lit by the first light source, and an LED of a second color at the end of the second light pipe. The second light pipe has diffusing features at locations adjacent the second areas to introduce light into the first light pipe. All the edges of the first light pipe, except for local areas in which light is being introduced by a source, are either painted white or are surrounded by a white diffusing material. These scattering areas may be non-white so long as they are efficient at scattering the light frequencies of concern. The bottom surface of the first light pipe may be mirrored or is also painted white or is on top of an efficient white scattering surface.

A sheet of grooved or prismatic material is positioned on the top surface of the light pipe so that the axis of the grooves is perpendicular to the edges in which light of the first color is being introduced. The grooved surface faces away from the light pipe. In a less efficient design, if only the bottom surface of the light pipe has diffusing features, then it is possible to incorporate the grooved surface into the top of the light pipe. The optical effect of the grooves is to guide light which impinges at a low angle in the direction of the grooves. However, light which is scattered close to the normal to the grooves is directed toward the normal; thus light is substantially either guided in the direction of the grooves or is directed perpendicular to the plane of the grooves. In this way, with respect to the axis of the grooves light is efficiently directed toward the eyebox of the viewer, assuming that the viewer is positioned more or less normal to the plane of the emissive surface.

A second sheet of prismatic material is placed on top of the first, grooves up, with the grooves at right angles to that of the first sheet. The optical effect of the grooves is the same as in the first sheet. Here the effect is to redirect light with respect to the axis of the grooves of the second sheet toward the eyebox.

The sheets of prismatic material have the same effect on the second color light with respect to directing light toward the eyebox. However, since the second color light is introduced in a direction transverse to the grooves of the first sheet, the second color light does not penetrate as well into the light pipe. The second color does illuminate local areas near the edge of introduction. At least in the case of a yellow-amber first color and a red second color, the red is not perceptible in the region beyond the red filter, i.e., it has no significant effect on the appearance of the background color. It is possible to introduce the second color on the same edge as the first color so that it does penetrate uniformly throughout the first light pipe. Then the color filter is the sole means of differentiating the two color areas of the display.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While this description is directed to a two color LCD back lit display, it should be understood that the invention is not so limited and that more than two colors can be used in such a display and that display devices other than LCDs can be illuminated by the same back lighting technique.

Figure 1:
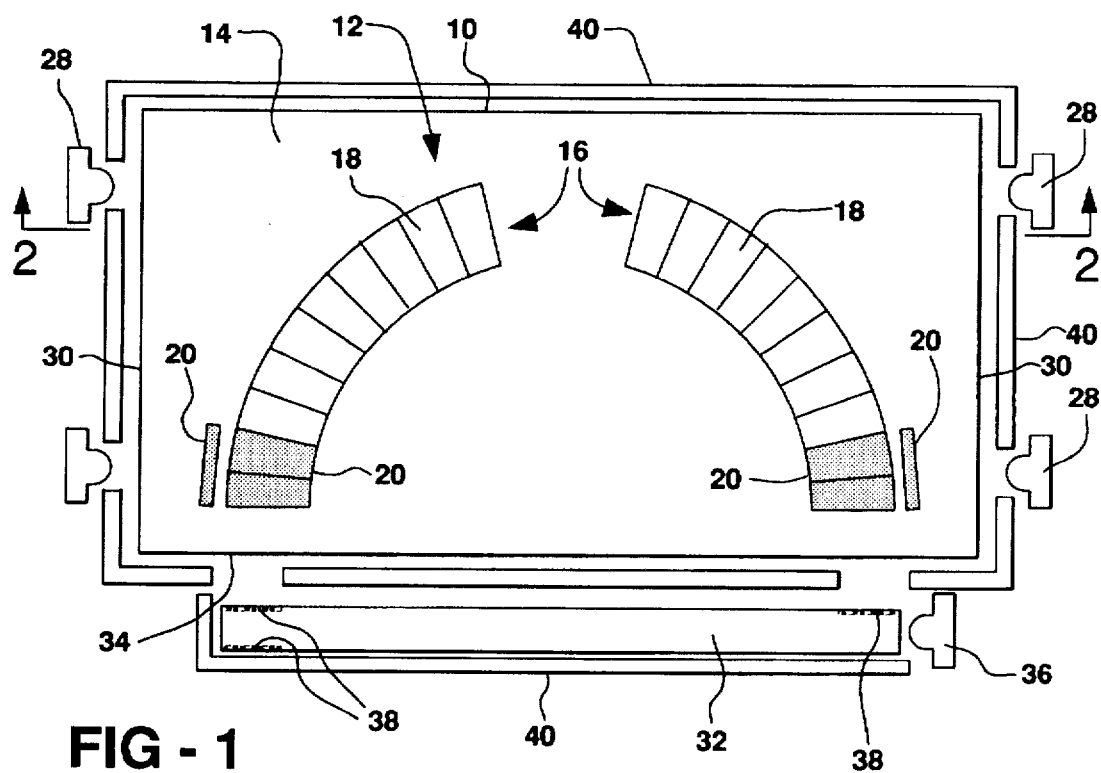
FIG. 1 is a front view of a multi-color display with back lighting according to the invention.
Figure 2:
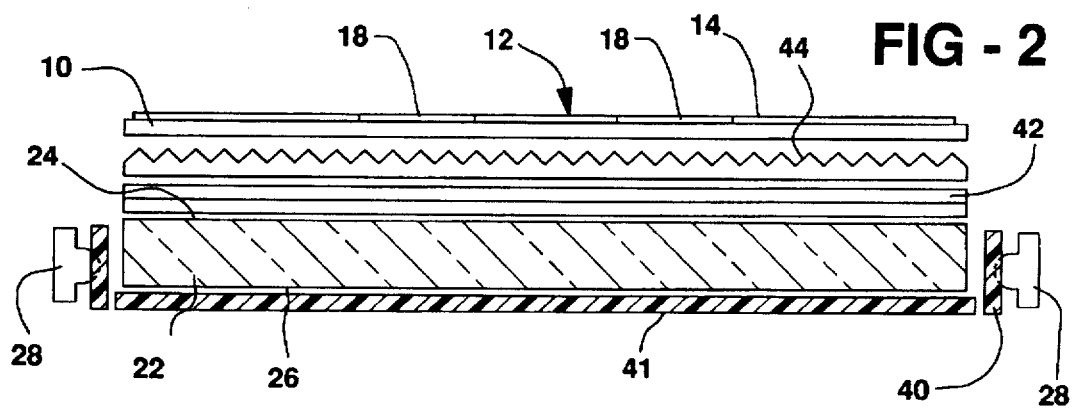
FIG. 2 is a cross section along line 2—2 of FIG. 1.

The FIGS. 1 and 2 show a LCD display having a liquid crystal cell 10 bearing a graphic applique 12 on the front face and a lighting arrangement at the rear. The applique comprises an opaque mask 14 defining illuminated openings 16 having first areas 18 which are clear to transmit any light emitted by the lighting arrangement and second areas near the bottom edge of the display covered by a color filter 20.

The lighting arrangement has a first or main light pipe 22 which is a thin block of transparent plastic material having narrow edges and major front and rear surfaces 24 and 26 having about the same size as the cell 10. A pair of LEDs 28 of a first color, preferably amber or a yellow-amber, are arranged at each side edge 30 of the light pipe 22 to direct light into the light pipe in a generally horizontal direction. The number and location of the LEDs required to attain uniform and adequate illumination depend on their intensity and the size and shape of the display.

A second light pipe 32 which is elongated, is positioned adjacent the bottom edge 34 of the main light pipe 22. An LED 36 of a second color, preferable red, is located at an end of the second light pipe 32 to introduce light into it. Two areas 38 of the second light pipe 32 aligned with the color filters 20 are abraded or equipped with diffuse features to promote the escape of light to the main light pipe 22 in the region of the filters 20.

Light diffusing reflectors 40 are arranged along the edges of the main light pipe 22 and around the second light pipe 32 except for openings which allow admission of light to the main light pipe. Similarly, a mirror or diffuse reflector 41 is located just behind the main light pipe 22. Alternatively, instead of using the reflectors 40 and 41, the edges and rear surface can be coated with a white paint. When light from either light source illuminates the interior of the light pipe, light travels through the light pipe by internal reflection and light which escapes through a side wall is reflected back by the diffusers 40 to maintain a high intensity light in the light pipe. To assist the light to escape to the display diffuse features on one or both major surfaces 24 and 26 scatter the light so that some will be directed toward the display either directly or by reflection from the rear reflector 41. An effective diffusing treatment is to sand one or preferably both major surfaces with 60 to 400 grit sandpaper.

Two prismatic sheets 42 and 44 of transparent material each having an array of V-shaped grooves are positioned between the light pipe 22 and the cell 10. The grooved side of each sheet faces the cell 10 and the other side is smooth and flat. The grooves of the sheet 42 are perpendicular to the ends 30 and the grooves of the sheet 44 are parallel to the ends 30.

Figure 3:
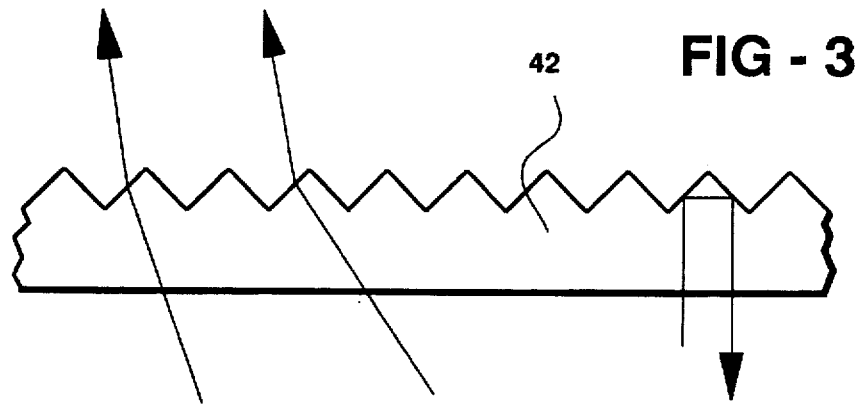
FIG. 3 is a is a light ray diagram illustrating the effect of a prismatic sheet as used in the display of FIG. 1.

The prismatic sheet is available as Scotch Brand Optical Lighting Film supplied by the Minnesota Mining and Manufacturing Company, St. Paul, Minn. The sheet, for example, is made of acrylic or polycarbonate and has prism grooves defined by facets preferably at 45° to the normal to the sheet and having a pitch of 0.014 inch. The grooves of the prismatic sheet 42 are perpendicular to the ends 30 so that the center ray of the cone of light from each LED 28 is parallel to the axis of the grooves and that light reaching the sheet 42 from the LEDs is incident at a small angle to the grooves. The prismatic sheet efficiently pipes the light by total internal reflection toward the end of the sheet opposite the light source. Light which is reflected to a prism facet at an angle too large for reflection will be refracted to the display device. Such refraction tends to bend the light toward the normal, as shown in FIG. 3, thereby increasing the light intensity in the eyebox at the expense of peripheral illumination. Light which is nearly normal to the sheet is reflected by the prismatic surface back through the flat side into the main light pipe. Similarly, light which is internally incident on the flat side at large angles is directed into the light pipe 22. Light which reaches the end opposite the source is reflected back so that the end serves as another source, thereby enhancing uniformity of illumination. Light scattered from any surface of the light pipe affords opportunity for a portion to approach the sheet 42 at an angle large enough for escape to the display device. Thus the prismatic sheet 42 along with the light pipe efficiently disperses light from a small area light source at the edge of the box to uniformly illuminate the display; hot spots are eliminated without the use of lossy materials. Light from the second source which enters the bottom edge 34 of the main light pipe travels transverse to the grooves of sheet 42 so that it does have the benefit of enhanced transmission, and thus penetrates the light pipe less efficiently, but is sufficient to illuminate the color filter area 20.

A second prismatic sheet 44 in front of the first sheet 42 has its grooves running at right angles to the grooves of the first sheet. The second sheet serves the purpose of directing the light toward the normal to the sheet as shown in FIG. 3. Whereas the first sheet performs that function with respect to one axis to reduce peripheral light loss, the second sheet does the same thing with respect to the other axis.

The amber light from the LEDs 28 uniformly illuminates the main light pipe 22 and the LCD cell 10. The amber light fully illuminates the clear area 18 of the applique but only poorly illuminates the red filter area 20. The red light from the second source effectively illuminates the area 20 and is passed by the filter to result in a red display area. The red light does not significantly effect the appearance of the amber light in the area 18; thus a separating wall is not needed. Since the presence of the red light does not impair the appearance of the amber light, it could be introduced at the side edge 30 along with the amber light.

It will thus be seen that by edge lighting the main light pipe a shallow display can be achieved. Due to the prismatic film 42 the display can be uniformly lighted by the amber theme color and local splotches of a second color can be introduced from any edge to illuminate a filter of the same color. The display structure is relatively simple and requires no separating walls between adjacent zones of different colors.

The embodiments of the invention in which an exclusive property or privilege is claimed are defined as follows:

1. A backlift multi-color display comprising:

a display device having a first area to be illuminated in a first color and a second area to be illuminated in a second color;

a light pipe behind the display device for back lighting the device;

a first light source comprising at least one light emitting diode edge lighting the light pipe for backlighting the whole display with light of the first color to thereby illuminate the first area;

a filter of the second color covering the second area to filter out light of the first color; and a second light source comprising at least one light emitting diode for admitting light of the second color to the light pipe in the region of the second area to thereby locally illuminate the second area with the second color.

2. The invention as defined in claim 1 wherein:

the first light source being located to direct light in one direction into the light pipe;

the second light source being located to direct light into the light pipe transverse to the one direction and adjacent the second area.

3. The invention as defined in claim 1 wherein:

the first light source being located to direct light in one direction into a first edge of the light pipe;

the second light source being located to direct light into a second edge of the light pipe transverse to the first edge and adjacent the second area.

4. The invention as defined in claim 3 wherein the second light source includes a second light pipe for directing light of the second color through the second edge of the first light pipe.

5. The invention as defined in claim 1 wherein:

the first light source being located to direct light along one axis into one or two first edges of the light pipe;

the second light source being located to direct light into at least one second edge of the light pipe transverse to the one axis; and the second area is adjacent a second edge for illumination by the second light source.

6. The invention as defined in claim 1 including:

a prismatic film between the light pipe and the display device, the film having an array of grooves on the side facing the display device and effective to preferentially transmit light in the direction of the grooves;

the first light source being located to direct light generally in the groove direction for illuminating the whole area of the display device; and the second light source being located to direct light transverse of the direction of the grooves to limit the penetration of the light of the second color into the display.

7. The invention as defined in claim 6 including a second prismatic film between the first prismatic film and the display device, the second prismatic film having an array of grooves on the side facing the display device and extending transverse of the grooves of the first prismatic film, whereby the prismatic films in combination direct light entering the films at a large angle to the normal in a direction at a smaller angle to the normal.

8. A backlit multi-color display comprising:

a liquid crystal display device having a first area to be illuminated in a first color and a second area to be illuminated in a second color;

a light pipe behind the display device for back lighting the device;

a first light source comprising at least one light emitting diode edge lighting the light pipe for backlighting the whole display with light of the first color to thereby illuminate the first area;

a filter of the second color covering the second area to filter out light of the first color; and a second light source comprising at least one light emitting diode emitting the second color for edge lighting the light pipe in the region of the second area to thereby locally illuminate the second area with the second color.

9. The invention as defined in claim 8 wherein the second light source includes a second light pipe for directing light of the second color through an edge of the first light pipe.

10. The invention as defined in claim 8 wherein the second light source includes:

a second light pipe which is elongated and extending along an edge of the first light pipe;

light dispersing features on the second light pipe for preferentially directing light to the second area; and a light emitting diode of the second light source emitting the second color at one end of the second light pipe.

11. The invention as defined in claim 8 including:

a prismatic film between the light pipe and the display device, the film having an array of grooves on the side facing the display device and effective to preferentially transmit light in the direction of the grooves;

the first light source being located to direct light generally in the groove direction for illuminating the whole area of the display device; and the second light source being located to direct light transverse of the direction of the grooves to limit the penetration of the light of the second color into the display.

12. The invention as defined in claim 8 wherein:

the light pipe is a transparent block with front and rear major surfaces parallel to the display device and narrow edges;

at least one of the major surfaces having diffusing means for scattering a portion of the light from the light pipe toward the display device; and means for reflecting light escaping from the rear major surface and from the light pipe edges back into the light pipe.

* * * * *